US006665594B1

(12) United States Patent
Armstrong

(10) Patent No.: US 6,665,594 B1
(45) Date of Patent: Dec. 16, 2003

(54) PLUG AND PLAY MODULAR MISSION PAYLOADS

(75) Inventor: Clay Armstrong, Jasper, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 74 days.

(21) Appl. No.: 10/012,613

(22) Filed: Dec. 13, 2001

(51) Int. Cl.[7] .......................... H04J 3/24; G01C 21/00

(52) U.S. Cl. .......................... 701/13; 701/24; 701/36; 370/349; 370/315; 224/3.15

(58) Field of Search .......................... 701/13, 1, 2, 24, 701/36, 215; 224/3.15, 120; 370/349, 315; 340/459

(56) References Cited

U.S. PATENT DOCUMENTS 5,271,582 A 12/1993 Perkins et al. .............. 244/158
5,322,248 A 6/1994 Ragab .............. 244/160
5,742,914 A * 4/1998 Hagenbuch .............. 701/35
5,802,255 A 9/1998 Hughs et al. .............. 395/75
6,056,237 A 5/2000 Woodland .............. 244/3.15
6,167,263 A 12/2000 Campbell .............. 455/431
6,175,783 B1 1/2001 Strength et al. .............. 701/13
6,176,451 B1 1/2001 Drymon .............. 244/3.14
6,284,870 B1 * 9/2001 Takaku et al. .............. 530/350

* cited by examiner

*Primary Examiner*—Thomas G. Black
*Assistant Examiner*—Arthur D. Donnelly
(74) *Attorney, Agent, or Firm*—Mark Homer

(57) ABSTRACT

The present application discloses plug and play modular mission payloads in the context of aerial vehicles, and a supporting open system architecture that moves the control function of mission payloads away from the ground station and into the aerial vehicle. The plug-and-play (PnP) modular mission payloads and web-based payload interface software resides in a payload computer in the vehicle, and this is networked via a uniform resource locator (URL) addressing scheme to a ground control station. Consequently, when new payload types are added to the system, integration issues and costs are minimized.

13 Claims, 3 Drawing Sheets

PnP Architecture Concept

PLUG AND PLAY MODULAR MISSION PAYLOADS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates to the computer control of mission payloads and, more particularly, to an improved open system architecture that moves the control function of mission payloads away from the control station and into the unmanned vehicle. This is accomplished with plug-and-play (PnP) modular mission payload architecture, and web-based payload interface software that resides in a payload computer in the vehicle and which is networked via a uniform resource locator (URL) addressing scheme to the control station.

2. Description of the Background

Unmanned vehicles (UVs) in operation today are designed around a single mission payload. This eases the initial design process for payload command and control, but normally requires extensive redesign for the incorporation of a new payload. Specifically, implementing a new payload type in a tactical unmanned aerial vehicle (UAV) requires changing software in the UAV itself, as well as in the ground control station, along with designing a new human computer interface for each payload. This is costly, time consuming and requires a complete flight re-certification for each new payload type introduced. In addition to the traditional Electro-Optic Payloads, users are now looking at Synthetic Aperture Radar payloads, Signal Intelligence payloads, Data Relay and Networking payloads, Meteorological payloads, Hyperspectral payloads, and other mission payloads. Each of these payloads has significantly different command and control functions, different human-computer interfaces, different data processing requirements, and they provide complex and differing data products and images to the UV operators. Current UV system designs do not incorporate the commands to manipulate these payloads and are not capable of processing and exploiting the data types. Thus, each time a UV is modified to accommodate a payload, physical changes must be made to either the payload or vehicle, and software must be changed in the vehicle and the control station, and in the ground station communication datalink. These software changes to the vehicle and control station and datalink also require costly air safety recertification.

The problem is becoming especially apparent as the increasing capability, quantity and awareness of UAVs, and the desire to utilize UAVs for expanded roles becomes more prevalent. There is a great need for a common interface for all payloads that may be carried by the UAV, and an open systems architecture to facilitate the integration of new and differing payloads, and which provides higher performance and minimal obsolescence. The same problem has arisen in other contexts, and there have been limited efforts to provide a solution. For example, U.S. Pat. No. 6,175,783 to Stength et al. confronts the problem in the context of outer space vehicles which have payload facilities supported by a host computer system at a space platform. The '783 patent attempts to take application-specific payload controllers and make them generic networked computers with payload control software resident on a remote space vehicle.

Similarly, U.S. Pat. No. 5,271,582 to Perkins et al. discloses a communication system for an unmanned space vehicle for electronically communicating with various diverse customer payloads. Multiple subsidiary small payloads can be connected to standard mechanical and electrical interfaces. However, this only partially addresses the problems of reconfiguration, recertification and obsolescence. There are as yet no known efforts to create an entirely plug-and-play (PnP) system with payload plug-ins for the UV which include essential parameters such as weight, center of gravity, electrical power consumption, physical size and volume, mounting structures, environmental conditions, etc. Moreover, there have been no efforts at web-enabling a system using a uniform resource locator (URL) system and graphical user front-end.

SUMMARY OF THE INVENTION

It is an object of the present invention to provide more effective and economical remote computer control (from a control station) of mission payloads in an unmanned vehicle.

It is another object to provide an improved open system architecture that moves the control function of mission payloads away from the control station and into the unmanned vehicle.

It is another object to provide a modular plug-and-play (PnP) architecture for control of mission payloads in a vehicle using web-based payload interface software that resides in a payload computer in the vehicle and which is networked via a uniform resource locator (URL) addressing scheme to a ground control station.

It is another object to provide an architecture as above which minimizes software changes for new and different payloads by moving the payload-specific software changes away from all flight critical software.

According to the present invention, the above-described and other objects are accomplished by providing an improved plug-and-play (PnP) system for remote control of any of a variety of different payloads in a vehicle which takes the payload interface software out of the control station and puts it in a dedicated payload computer resident in the air vehicle. The system generally comprises a dedicated payload computer resident in the vehicle which is connected to one or more payloads therein for control. The payload computer is loaded with a discrete software module for each different payload which contains payload-specific data parameters inclusive of weight and power consumption, etc. The payload computer is also equipped with a generic software application that includes a generic command set as required to control a variety of different payloads. The generic software application is adapted to assimilate the data parameters of the software module into its generic command set to thereby issue payload-specific commands to the payload. In this manner, an operator can remotely control one or more payloads from a ground station via a computer, display, and wireless communication link which provides a remote human computer interface. Preferably, all software including the payload-specific software module, the generic payload application, and the ground control software is programmed using software such as PERL, JAVA or basic HTML. The payload-specific software module is stored as a URL and is configured as a web-based plug-in, and in this manner the operator is presented a standard web browser with appropriate plug-ins installed, as required, for each type of payload. When the payload operator transmits a payload command via the web browser screen, the payload computer interprets the command and calls the payload specific command to the proper payload via a standard interface protocol. The benefit of this approach is that it minimizes software changes required for full flight certification by moving the software changes away from the flight critical software and hardware.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The improved open system architecture with plug-and-play (PnP) payload interface according to the present invention involves taking the payload interface software out of the control station and making it resident in a PnP payload interface controller (PIC) in the unmanned vehicle (UV). This compels a high-level restructuring of conventional payload communication systems as will be described.

Figure 1:
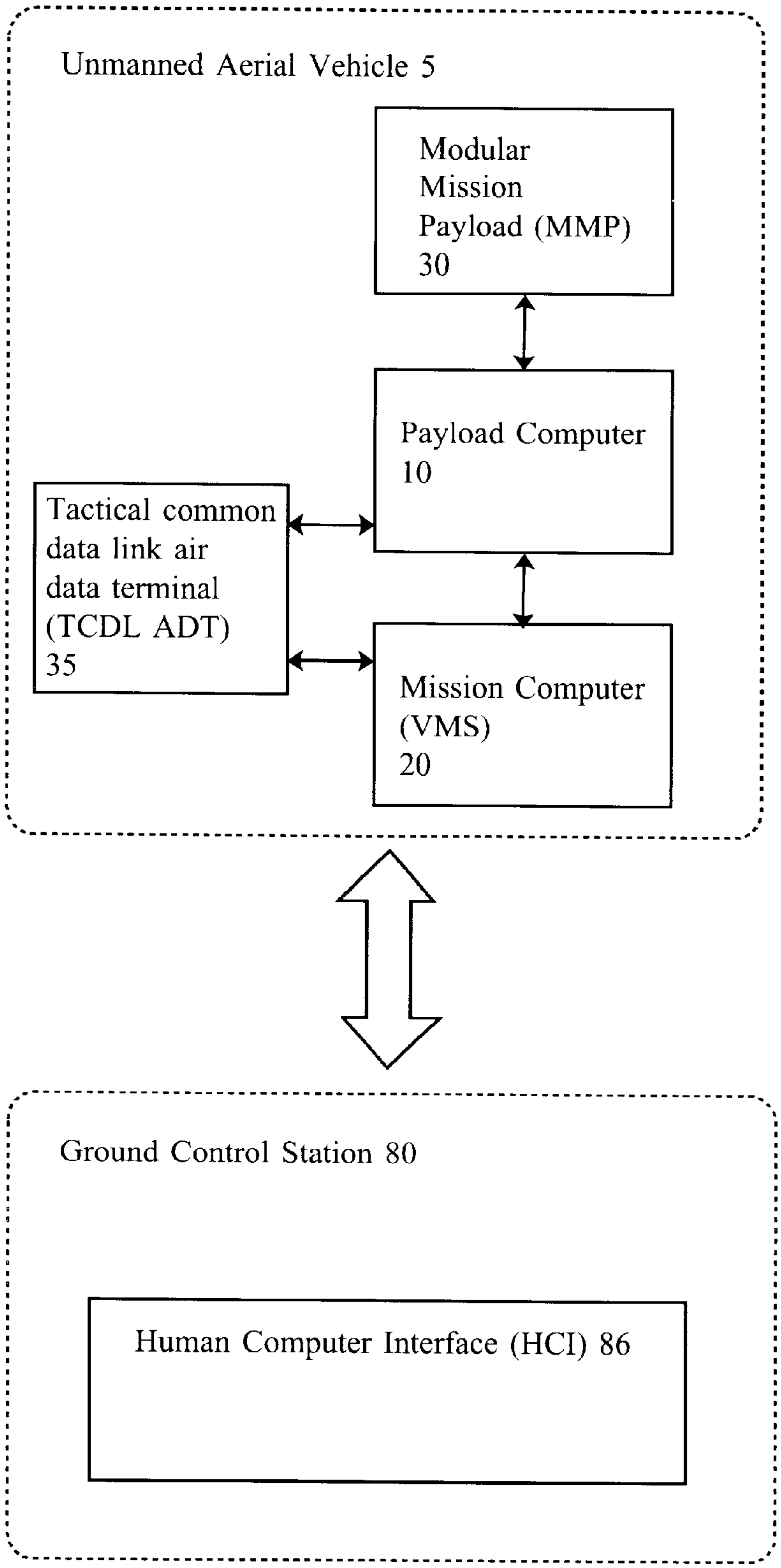
FIG. 1 is a conceptual block diagram illustrating the open system architecture with plug & play (PnP) payload interface according to the present invention.

FIG. 1 is a conceptual block diagram illustrating the system according to the present invention. An existing unmanned aerial vehicle 5 is equipped with an existing modular mission payload (MMP) 30 located in the aerial vehicle 5. In accordance with the present invention, the MMP 30 is connected by high-speed data bus to a dedicated payload computer 10 that is also located in the aerial vehicle 5. Payload computer 10 is a substantially conventional PC networked to the existing mission computer 20 that is also resident on the unmanned aerial vehicle 5. Both the mission computer 20 and payload computer 10 are provided with a common communication interface in the aerial vehicle 5, and this may be the existing tactical common data link air data terminal (TCDL ADT) 35. With this configuration, the communication interface 35 provides a wireless communication uplink for remote control of the aerial vehicle 5 via mission computer 20, as well as for remote control of the modular mission payload (MMP) 30 via payload computer 10. The communication interface 35 also provides a communication downlink for transmitting vehicle and sensor data to the control station 80. The ground control station 80 and associated control equipment (to be described) is equipped with Human Computer Interface (HCI) 86 by which an operator can interactively control both the mission payload 30 functions as well as the control functions of the aerial vehicle 5. To fully implement the plug-and-play goal of present invention, the payload computer 10 is configured as a network server and the Human Computer Interfaces (HCI) 86 as a network client. The payload computer 10 is pre-loaded with control software capable of executing commands required to control all types of payloads. Moreover, generic software is provided at the Human Computer Interface (HCI) 86 that provides a standard graphical interface used to control all types of payloads. To effectively make the mission payload 30 plug-and-play (PnP), a payload-specific software module is loaded into the payload computer 10 in vehicle 5 at the time that payload 30 is installed. The payload interface software module serves as a "plug-in" to the generic control software in payload computer 10 and thereby provides all payload-specific data parameters to allow the payload computer 10 to interface with the payload 30. Preferably, the payload interface software module is a web-enabled "plug-in" stored using a uniform resource locator (URL) addressing scheme. In this manner, both the generic control software in payload computer 10 as well as the generic interface software at the Human Computer Interface (HCI) 86 may easily access the payload interface software module, thereby allowing the Human Computer Interface (HCI) 86 to act as a web-based client to allow an operator to remotely control the mission payload 30 via the standardized graphical interface at the Human Computer Interface (HCI) 86. This modular and web-based configuration minimizes software changes required for the Human Computer Interface (HCI) 86 because it moves the software changes away from all flight critical software, and instead simply requires the loading of a new software module "plug-in" at the payload computer 10 each time that a new payload is installed.

Figure 2:
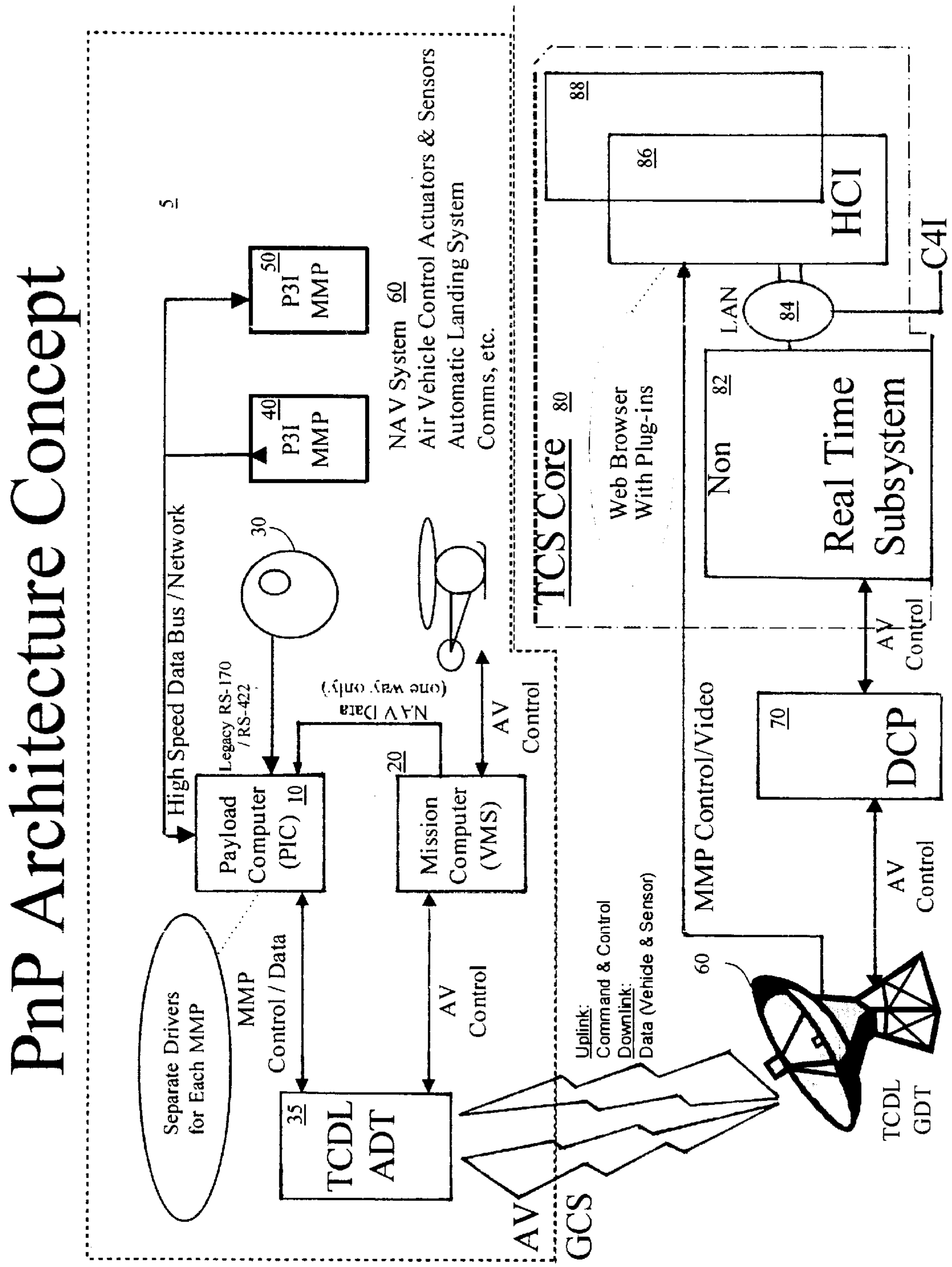
FIG. 2 is a more detailed block diagram illustrating the hardware and software components necessary for implementing the system of FIG. 2.

FIG. 2 is a more detailed block diagram illustrating the hardware and software components necessary for implementing the system. For exemplary purposes, the system is disclosed in the context of a vertical take-off and landing tactical unmanned aerial vehicle 5 (VTUAV) such as the Firescout. One or more modular mission payloads (MMPs) 30, 40, 50 may be located in the aerial vehicle 5 and all are connected by high-speed data bus for control by an on-board payload computer 10 (MMP 30 is herein shown to be a traditional Electro-Optic Payload). Payload computer 10 is networked to the mission computer 20 that is also resident on the unmanned aerial vehicle 5 via standard RS-422 link or the like. The mission computer 20 effectively controls the aerial vehicle 5 in a known manner via connections to the vehicle control actuators, landing system, sensors, actuators, etc. Both the mission computer 20 and payload computer 10 are linked to and provided with a common communication interface 30 at the aerial vehicle 5, this being designated as the tactical common data link air data terminal (TCDL ADT). The communication interface 35 provides a communication uplink for remote control of the aerial vehicle 5 via mission computer 20, as well as for remote control of the modular mission payloads (MMPs) 30, 40, 50 via payload computer 10. The communication interface 35 also provides a communication downlink for transmitting vehicle and sensor data to the ground control station 80. Uploading/downloading is accomplished through a tactical common data link ground data terminal 60 (TCDL GDT) that is connected via an existing Datalink Control Processor (DCP) 70 to the tactical control station (TCS) core ground control station 80. The tactical control station 80 further comprises a Non-Real-Time Processor 82 networked by LAN connection C4I to one or more Human Computer Interfaces (HCIs) 86, 88. In this manner, an operator can interactively control both the mission payload 30–50 functions as well as the control functions of the aerial vehicle 5 from any of the Human Computer Interfaces (HCIs) 86, 88. It can be seen that implementing a new payload type in the aerial vehicle 5 using the abovedescribed system configuration does not necessarily require changing software in the mission computer (VMS) 20 or the Datalink Control Processor (DCP) 70, and as will be seen it does not require any reprogramming of the Non-Real-Time Processor 82 nor any new Human Computer Interfaces (HCIs) 86, 88.

The payload computer 10 is pre-programmed with executable software including a standardized generic command set as required to control any and all payloads 30–50. In addition, a payload-specific interface software module "plug-in" is loaded into payload computer 10 to provide all. payload-specific data parameters to allow the generic executable software in payload computer 10 to interface directly with the payload 30. Moreover, all physical payload connections are preferably standardized. Likewise, the control and interface software resident at the Human Computer Interfaces (HCIs) 86, 88 is standardized for all payload types. This configuration effectively makes the mission payloads 30–50 plug-and-play (PnP) since the payload interface software now resides in the payload computer 10 in the vehicle 5, and all that is needed to exchange payloads is to swap in a new one and load new payload interface software. Presently, the payload control software must be installed at both the payload computer 10, the datalink control processor (DCP) 70 and the Human Computer Interfaces (HCIs) 86, 88, albeit it is equally possible to accomplish this with a single load at one end and a download to the other. In either case, loading and subsequent accessing is further simplified by making the payload interface software at both the payload computer 10 and at the Human Computer Interfaces (HCIs) 86, 88 modular and web-based. In other words, each new payload is associated with a new payload interface software module or "page" which includes software to control the payload and display the status information and data from the sensors. This way, as new payloads are developed, new payload interface software modules are written each comprising a specifically developed interface page or group of pages to allow for the control of a particular payload type. Thus, when the new payload is introduced, it is physically installed and a new page or group of pages is installed on the payload computer 10. Upon installation, each page is assigned a unique uniform resource locator (URL) address based on a standard web-based URL addressing scheme. Each page is preferably designed using web compatible software such as PERL, JAVA or basic HTML so that it can be presented to the operator at the Human Computer Interfaces (HCIs) 86, 88 via a standard web browser with appropriate plug-ins installed, as required. This way, when the payload operator activates a payload command via the web browser screen at a Human Computer Interface (HCIs) 86, 88, the payload computer 10 on vehicle 5 interprets the command and calls the payload specific command to the proper payload 30–50 via a standard URL interface protocol. The benefit of the foregoing configuration is that it minimizes software changes required for the VMS 20, DCP 70, or Non-Real-Time Processor 82, or any new Human Computer Interfaces (HCIs) 86, 88. This in turn should alleviate the requirement for full flight certification by moving the software changes away from the flight critical software. It also allows independent development and layout of a standard web-browser for the Human Computer Interface (HCIs) 86, 88 regardless of the specific mission of a given payload. Appropriate web development software is readily available such as JAVA and PERL, and the software is easily upgradeable, thereby minimizing the likelihood of becoming obsolete for the life of the vehicle 5.

Figure 3:
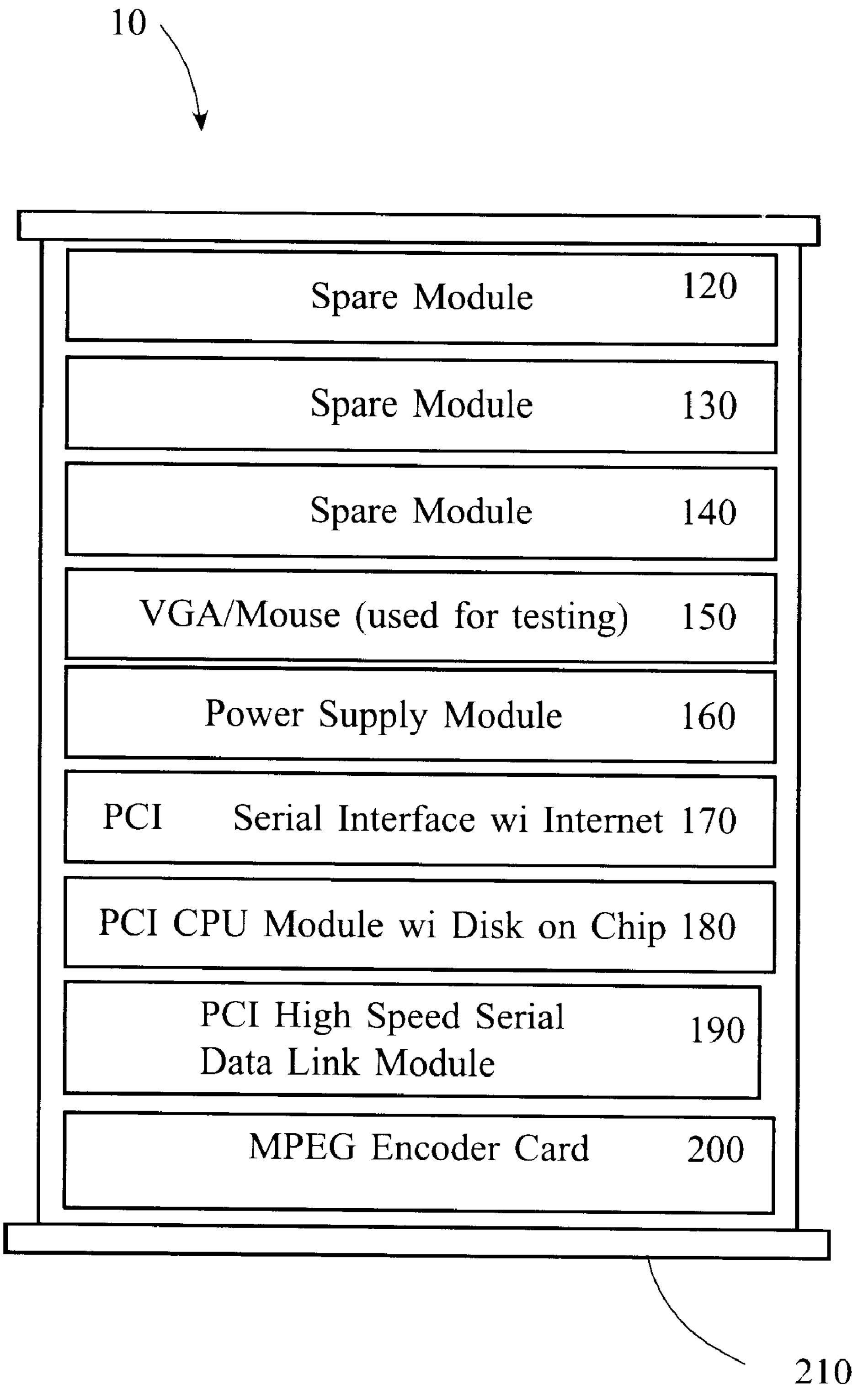
FIG. 3 is a block diagram of the payload computer 10 in accordance with the abovedescribed architecture.

FIG. 3 is a block diagram of the payload computer 10 in accordance with the abovedescribed architecture. The payload computer 10 of the present invention incorporates the basic architecture of a personal computer, assembled with the following configuration:

Processor Board 180, preferably at least a Pentium central processor, RAM, DiskOnChip and Ethernet Adapter for networking with the mission computer 20. For example, an industry standard PC-104+ motherboard with standard chipset and conventional PC operating system will suffice. Sufficient RAM is required to fully load all interface modules, and 256 Kb is envisioned. In addition, sufficient hard disk space or other non-volatile memory is required for web page storage.

Power Supply Module 160, which may be a conventional regulated AC/DC power supply.

A standard serial interface 170.

High speed serial communication module 190, preferably an RS-422 Interface Board for communicating with the common communication interface 30 of FIG. 1.

Video Frame Grabber Board 200, preferably an MPEG video frame grabber for MPEG encoding of video data and still picture taking.

A custom enclosure 210, preferably leaving open bays for spare modules 120–140 which may include other interface boards such as IEEE-1394 firewire, MIL-STP-1533B, etc.

Each payload interface software module is developed specifically for each payload type. For example, a web page developed for a daylight Electro-Optic (EO) camera interface comprises all controls required to manipulate the camera in the EO mode including: Iris, field-of-view, focus, auto iris, cage, stow, gyro modes, in addition to slewing the gimbal and viewing the video.

As can be seen, the foregoing configuration greatly simplifies the reconfiguration process for each new payload. It also encourages the centralization of modular mission payload data in a central data warehouse for all potential payloads. This simplifies tracking of new MMP developments and upgrades. More importantly, new payload interface modules can quickly and easily be compiled from the overarching database.

The foregoing open systems architecture increases the ability to integrate and field new mission payloads quickly and effectively by minimizing software modifications and safety of flight concerns. The shift of payload specific software away from the flight critical software reduces and may eliminate the flight certification process for new payload integration efforts. While the foregoing open systems architecture has been described in the context of unmanned aerial vehicles (and their control systems), it has definite application to all unmanned platforms that may require modularity and integration of mission payloads in the future. The design and implementation will not preclude it from being incorporated into ground vehicles, space vehicles, and underwater vehicles.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

I claim:

1. A system for remote control of any of a variety of different payloads in a vehicle, comprising:

a dedicated payload computer resident in said vehicle and connected to a payload therein for control thereof;

a software module resident on said payload computer and containing payload-specific data parameters inclusive of weight and power consumption;

a software application resident on said payload computer and including a generic command set as required to control a variety of different payloads, said generic software application incorporating the data parameters of the software module into said generic command set for issuing payload-specific commands to said payload; and a control station inclusive of a computer, display, and communication link for providing a remote human computer interface with said payload via the payload computer.

2. The system for remote control of any of a variety of different payloads in a vehicle according to claim 1, wherein said control station computer is configured as a network client, said payload computer is configured as a network server for networked communication with said control station computer, and said software module is stored in said payload computer according to a uniform resource locator (URL) addressing scheme.

3. A system for remotely controlling a payload in a vehicle, comprising:

a payload computer resident in the vehicle and connected to a payload therein for control, said payload computer including, a discrete software module loaded in said payload computer and containing data parameters specific to said payload, and a generic software application loaded in said payload computer and containing a generic instructions for controlling a variety of different payloads;

whereby said generic software application assimilates the data parameters of the discrete software module into its generic instructions to thereby issue payload-specific commands to the payload.

4. The system for remotely controlling a payload in a vehicle according to claim 3, further comprising a control station inclusive of a computer, display, and wireless communication link for providing a remote human computer interface with said payload via the payload computer.

5. The system for remotely controlling a payload in a vehicle according to claim 4, wherein said control station computer is configured as a network client and said payload computer is configured as a network server for networked communication with said control station computer.

6. The system for remotely controlling a payload in a vehicle according to claim 5, wherein said discrete software module is stored in said payload computer according to a uniform resource locator (URL) addressing scheme.

7. The system for remotely controlling a payload in a vehicle according to claim 6, wherein said discrete software module is configured as a web-based plug-in.

8. A system for remotely controlling payloads in a vehicle of a type having a payload computer resident therein for connection to a variety of payloads for control, comprising:

a generic software application containing generic instructions for controlling said variety of different payloads; and a discrete software module loaded in said payload computer and containing data parameters specific to one of said payloads;

whereby said generic software application assimilates the data parameters of the discrete software module into its generic instructions to thereby issue payload-specific commands to the payloads.

9. The system for remotely controlling payloads in a vehicle according to claim 8, wherein said generic software is loaded in said payload computer.

10. The system for remotely controlling payloads in a vehicle according to claim 8, further comprising a remote computer interface in wireless communication with said payload computer for providing a human interface to said payload.

11. The system for remotely controlling payloads in a vehicle according to claim 10, wherein said generic software is loaded in said remote computer interface, whereby the generic software in both of said remote computer interface and payload computer may access the payload interface software module in said payload computer, thereby allowing the remote computer interface to remotely control the payloads.

12. The system for remotely controlling payloads in a vehicle according to claim 11, further comprising a plurality of discrete web-based plug-in software modules loaded in said payload computer and each containing data parameters specific to one of said payloads.

13. The system for remotely controlling payloads in a vehicle according to claim 12, wherein said plurality of discrete web-based plug-in software modules are stored in said payload computer according to a uniform resource locator (URL) addressing scheme.

* * * * *